W. H. WILLIAMS.
Gate and Door Closing Device.
No. 218,801. Patented Aug. 19, 1879.
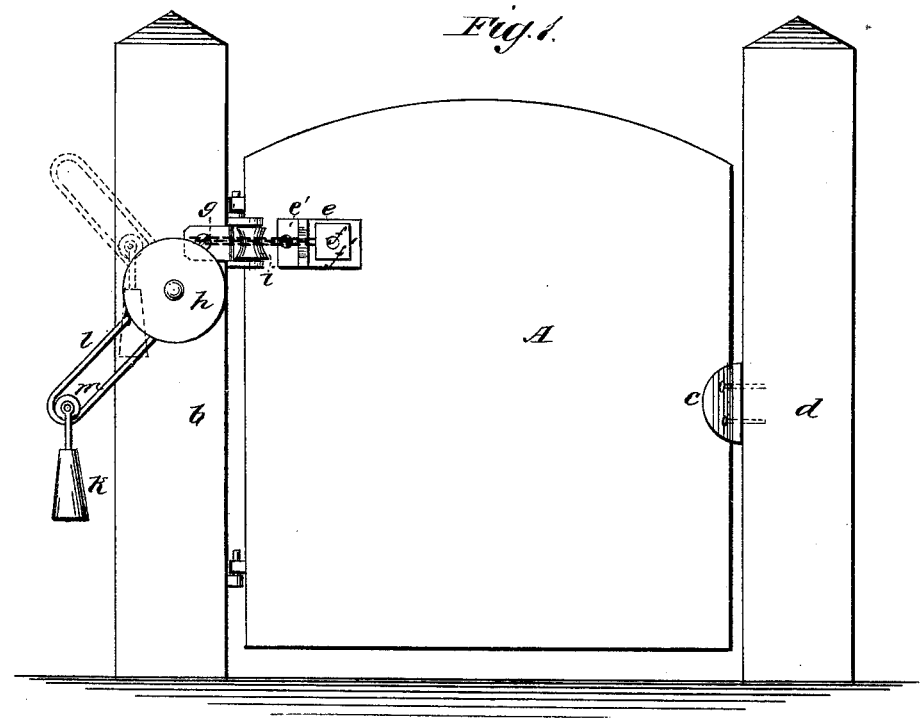
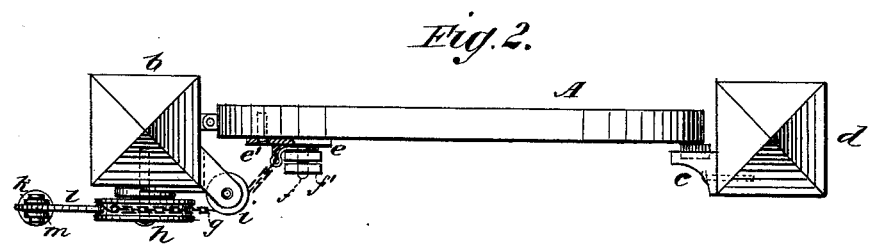

UNITED STATES PATENT OFFICE.

WILLIAM H. WILLIAMS, OF MINEOLA, NEW YORK.

IMPROVEMENT IN GATE AND DOOR CLOSING DEVICES.

Specification forming part of Letters Patent No. 218,801, dated August 19, 1879; application filed April 28, 1879.

*To all whom it may concern:*

Be it known that I, WILLIAM HENRY WILLIAMS, of Mineola, in the county of Queens and State of New York, have invented a new and useful Improvement in Gate and Door Hangings, of which the following is a specification.

My improvements relate to gate and door hangings wherein the gate is closed by a weight; and the invention consists in certain novel means, to be hereinafter described, whereby the weight is shifted to change its purchase and obtain the greatest effect when the gate or door is closed.

In the accompanying drawings, Figure 1 is a side elevation of a gate fitted with my improved hangings. Fig. 2 is a top view of the same.

Similar letters of reference indicate corresponding parts.

A is a gate, hung on post $b$, and closing against a stop, $e$, that is fixed on post $d$. The stop $e$ is faced with rubber or fitted with a plug of elastic material, to lessen the concussion.

Upon gate A is a plate, $e$, having a projecting lug, $e'$, which plate is attached by a screw and by a bolt, $f$, to which the chain $g$ is held by an additional nut, $f'$, that permits lengthening or shortening of the chain. The lug $e'$ prevents the chain from getting on the center when the gate is open.

Upon post $b$ is attached a wheel or segment, $h$, so as to revolve, and upon the periphery of wheel $h$ the chain $g$ is connected, and the chain is supported intermediately by a grooved friction-wheel, $i$, that is attached to post $b$.

The weight $k$, for closing the gate, is attached upon the wheel $h$ by a loop, $l$, in which the weight slides to and from the center of the wheel, and to prevent friction a pulley, $m$, is applied in the loop $l$, from which pulley the weight is suspended.

The described parts are to be adjusted so that when the gate is closed the chain $g$ will be partly wound on wheel $h$ and weight $k$ at the outer end of the inclined plane formed by loop $l$. In this position the weight, being at the farthest point from the center, exerts its greatest power to keep the gate closed and prevent it from being opened by gusts of wind or other causes.

When the gate is being opened by hand, the wheel $h$ is turned and loop $l$ raised to a horizontal, and finally to an inclined, position, as shown by dotted lines, forming an inclined plane in a direction opposite to the first position, so that the weight will run toward the wheel and remain there until the gate is again closed. These changes in the position of the weight can be arranged to occur when the gate is more or less open or closed; and it is to be understood that the weight should be sufficient when at its point of least effect to close the gate.

I have shown and described the invention in connection with a gate; but it can be applied equally as well to a door.

The advantages of this construction are as follows: The weight may be hung on the gate-post, and an extra post is not required. The weight acts with greatest effect to retain the gate closed, and in closing the gate only the required power for that purpose is exerted, and the concussion against the stop will be thereby lessened. The gate is more easily opened, and requires no fastening to keep it closed.

Having thus described my invention, I claim as new and desire to secure by Letters Patent—

1. In gate and door hangings, the combination, with the gate-chain $g$ and wheel or segment $h$, of the weight $k$, fitted to slide to and from the center of $h$, substantially as and for the purposes specified.

2. In gate and door hangings, the combination, with the chain-wheel $h$, of the loop $l$ and loosely-hung weight $k$, as described and shown, and for the purposes described.

WILLIAM HENRY WILLIAMS.

Witnesses:
U. GRANT WILLIAMS,
J. P. WILLIAMS.